United States Patent
Kanno et al.

[11] Patent Number: 5,766,110
[45] Date of Patent: Jun. 16, 1998

[54] STARTING CLUTCH CONTROL SYSTEM

[75] Inventors: Yutaka Kanno; Hideo Koyama; Masaaki Yamaguchi, all of Wako, Japan

[73] Assignee: Honda Giken Kogyo Kabushiki Kaisha, Tokyo, Japan

[21] Appl. No.: 704,272

[22] Filed: Aug. 28, 1996

[30] Foreign Application Priority Data

Aug. 31, 1995 [JP] Japan ............................. 7-245181

[51] Int. Cl.⁶ .......................................... F16H 59/00
[52] U.S. Cl. ................... 477/39; 477/70; 477/80; 477/175
[58] Field of Search ................ 477/70, 80, 166, 477/174, 175, 176, 180, 39

[56] References Cited

U.S. PATENT DOCUMENTS

| | | | |
|---|---|---|---|
| 4,582,185 | 4/1986 | Grimes et al. ............ | 477/176 X |
| 4,624,349 | 11/1986 | Watanabe . | |
| 4,632,231 | 12/1986 | Hattori et al. ............. | 477/175 |
| 4,860,863 | 8/1989 | Hayashi ................... | 477/39 |
| 4,893,526 | 1/1990 | Tokoro .................... | 477/43 |
| 4,905,801 | 3/1990 | Tezuka .................... | 477/87 |
| 5,157,608 | 10/1992 | Sankpal et al. ........... | 477/155 X |
| 5,184,527 | 2/1993 | Nakamura ................ | 477/97 X |
| 5,213,186 | 5/1993 | Murata .................... | 477/169 |
| 5,305,663 | 4/1994 | Leonard et al. .......... | 477/155 X |
| 5,309,790 | 5/1994 | Tanaka ..................... | 477/161 X |
| 5,364,321 | 11/1994 | Togai et al. ............... | 477/42 |
| 5,498,217 | 3/1996 | Maruyama et al. ........ | 477/169 |
| 5,562,571 | 10/1996 | Maruyama et al. ........ | 477/174 |

FOREIGN PATENT DOCUMENTS

0310277 A2  4/1989  European Pat. Off. .
63-305039  12/1988  Japan .

OTHER PUBLICATIONS

Patent Abstracts of Japan, vol. 013, No. 258 (M-838), Jun. 15, 1989 & JP-A-01 063427 (Daihatsu Motor Co., Ltd.), Mar. 9, 1989.

Patent Abstracts of Japan, vol. 017, No. 465 (M-1468), Aug. 25, 1993 & JP-A-05 106720 (Suzuki Motor Corp. Others: 01), Apr. 27, 1993.

*Primary Examiner*—Charles A. Marmor
*Assistant Examiner*—Peter T. Kwon
*Attorney, Agent, or Firm*—Frishauf, Holtz, Goodman, Langer & Chick

[57] ABSTRACT

A control system for a starting clutch installed in an automotive vehicle. The starting clutch is arranged between the engine and at least one wheel of the vehicle, for controlling engagement between the engine and the at least one wheel. A basic torque capacity of the starting clutch is calculated based on the rotational speed of the engine, and a torque capacity correction value is determined such that it assumes a minimal value when a clutch speed ratio of the starting clutch detected by a clutch speed ratio sensor is equal to 1.0 and progressively increases as the clutch speed ratio increases and decreases from 1.0. The determined torque capacity correction value is changed based on the throttle valve opening, and the torque capacity of the starting clutch is determined based on the changed torque capacity correction value and the calculated basic torque capacity.

9 Claims, 6 Drawing Sheets

| $\theta$ TH | $\frac{4}{8}$ | $\frac{5}{8}$ | $\frac{6}{8}$ | $\frac{7}{8}$ | $\frac{8}{8}$ |
|---|---|---|---|---|---|
| $\Delta \alpha$ | $\frac{1}{1000}$ | $\frac{1}{800}$ | $\frac{1}{600}$ | 1 | 1 |

STARTING CLUTCH CONTROL SYSTEM

BACKGROUND OF THE INVENTION

1. Field of the Invention

This invention relates to a starting clutch control system for automotive vehicles, which controls torque transmitted through a starting clutch of the vehicle at the start of the vehicle.

2. Prior Art

To control torque transmitted through a starting clutch of an automotive vehicle at the start of the vehicle, a clutch control method has been proposed, for example, as disclosed in Japanese Laid-Open Patent Application (Kokai) No. 63-305039. According to the proposed clutch control method, a value of a torque capacity coefficient C is retrieved from a torque capacity coefficient C map, according to a clutch speed ratio, and a clutch control value Tcl is calculated based on the value of the torque capacity coefficient C and the rotational speed of an internal combustion engine mounted in the vehicle, to thereby control the torque transmitted through the starting clutch.

In the proposed clutch control method, however, a single capacity coefficient C map is provided, which is set based only on the clutch speed ratio. As a result, when a throttle valve of the engine is suddenly operated, it is impossible to control the torque transmitted through the starting clutch so as to fully absorb or mitigate a shock caused by engine torque fluctuations.

Further, the torque capacity coefficient C map has coefficient values set for only a range of clutch speed ratio from 0 to 1.0. As a result, when the clutch speed ratio exceeds 1.0, e.g. when engine braking is applied, it is also impossible to avoid a shock caused by engine torque fluctuations.

SUMMARY OF THE INVENTION

It is the object of the invention to provide a starting clutch control system for automotive vehicles, which is capable of fully absorbing or mitigating a shock caused by engine torque fluctuations of an internal combustion engine mounted in the vehicle, for example, upon sudden operation of the throttle valve, over a wide range of clutch speed ratios, to thereby improve the drivability as well as curtail fuel consumption.

To attain the above object, the present invention provides a control system for a starting clutch installed in an automotive vehicle having an internal combustion engine installed therein, and at least one wheel, the engine having a throttle valve, the starting clutch being arranged between the engine and the at least one wheel, for controlling engagement between the engine and the at least one wheel, the control system comprising:

engine rotational speed-detecting means for detecting rotational speed of the engine;

clutch speed ratio-detecting means for detecting a speed ratio of the starting clutch;

throttle valve opening-detecting means for detecting opening of the throttle valve;

basic torque capacity-calculating means for calculating basic torque capacity of the starting clutch, based on the rotational speed of the engine;

torque capacity correction value-determining means for determining a torque capacity correction value such that it assumes a minimal value when the clutch speed ratio detected by the clutch speed ratio-detecting means is equal to 1.0 and progressively increases as the clutch speed ratio increases and decreases from 1.0;

torque capacity correction value-changing means for changing the torque capacity correction value determined by the torque capacity correction value-determining means, based on the throttle valve opening detected by the throttle valve opening-detecting means; and torque capacity-determining means for determining torque capacity of the starting clutch, based on the torque capacity correction value changed by the torque capacity correction value-changing means and the basic torque capacity calculated by the basic torque capacity-calculating means.

As a result, a shock caused by engine torque fluctuations due to sudden operation of the throttle valve can be sufficiently absorbed or mitigated over a wide range of clutch speed ratios, to thereby further improve the drivability and curtail fuel consumption.

Preferably, when the throttle valve opening detected is larger than a predetermined value, the torque capacity correction value-changing means sets the torque capacity correction value to such a value that the torque capacity of the starting clutch has a smaller value than a value assumed when the throttle valve opening is smaller than the predetermined value.

As a result, the fuel consumption can be curtailed during cruising of the vehicle while improving drivability.

More preferably, when the throttle valve opening detected is almost zero, the torque capacity correction value-changing means sets the torque capacity correction value to such a value that the torque capacity of the starting clutch has a further smaller value than the value assumed when the throttle valve opening is larger than the predetermined value.

As a result, when the accelerator pedal is suddenly released during traveling of the vehicle, or when engine braking is applied, a shock caused by transmission torque fluctuations can be absorbed or mitigated.

Also preferably, the torque capacity correction value-changing means sets the torque capacity correction value such that the torque capacity of the starting clutch is increased as the clutch speed ratio increases, when the throttle valve opening detected is smaller than the predetermined value and at the same time the clutch speed ratio detected is smaller than a predetermined value which is smaller than 1.0.

As a result, when the accelerator pedal is slightly stepped on while the vehicle is in stoppage, a shock on passengers can be significantly reduced.

More preferably, torque capacity correction value-changing means sets the torque capacity correction value to a minimum value, when the throttle valve opening detected is smaller than the predetermined value but not equal to zero and at the same time the clutch speed ratio detected is equal to zero.

Preferably, the torque capacity correction value-changing means provides a plurality of torque capacity correction value characteristics corresponding respectively to a plurality of different throttle valve opening ranges, the torque capacity correction value-changing means changing the torque capacity correction value so as to be progressively shifted from a value determined according to one of two torque capacity correction value characteristics out of the plurality of the torque capacity correction value characteristics to a value determined according to the other one of the two torque capacity correction value characteristics.

More preferably, the torque capacity correction value-changing means carries out the progressive shifting of the torque capacity correction value at a higher rate, when the progressive shifting takes place from a value determined according to a torque capacity correction value characteristic having a higher level out of the selected two torque capacity correction value characteristics to a value determined according to a torque capacity correction value characteristic having a lower level, the torque capacity correction value-changing means carrying out the progressive shifting at a lower rate when the progressive shifting takes place from a value determined according to the torque capacity correction characteristic having a lower level out of the selected two torque capacity correction value characteristics to a value determined according to the torque capacity correction value characteristic having a higher level.

The above and other objects, features, and advantages of the invention will be more apparent from the following detailed description taken in conjunction with the accompanying drawings.

DETAILED DESCRIPTION

The invention will now be described in detail with reference to the drawings showing an embodiment thereof.

Figure 1:
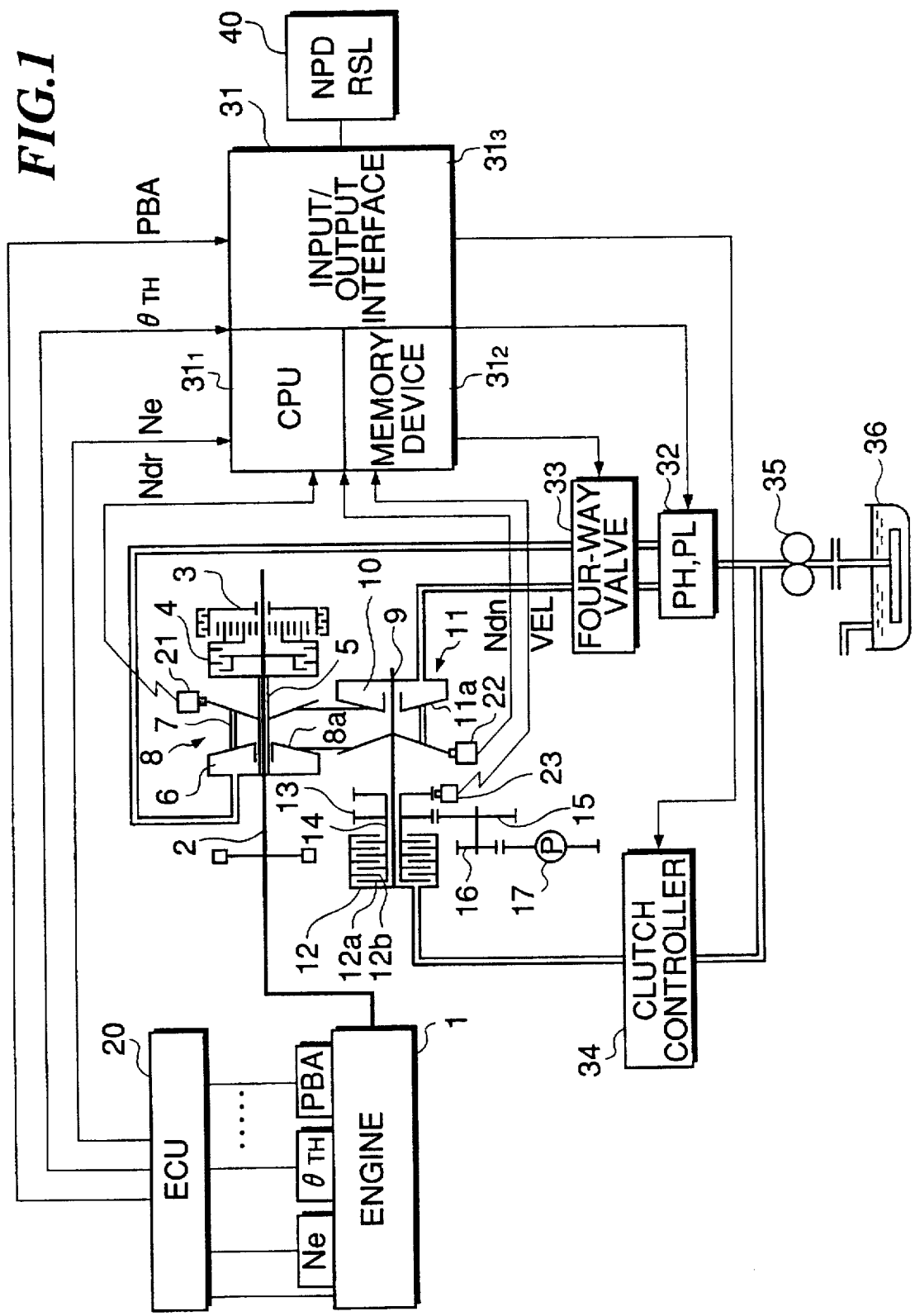
FIG. 1 is a schematic diagram showing the arrangement of a starting clutch control system for an automotive vehicle, according to an embodiment of the invention.

Referring first to FIG. 1, there is schematically illustrated the arrangement of a starting clutch control system for an automotive vehicle according to an embodiment of the invention. In the present embodiment, a transmission employed in the automotive vehicle is a continuously variable-speed transmission (hereinafter referred to as "the CVT").

In FIG. 1, reference numeral 1 designates an internal combustion engine (hereinafter referred to as "the engine") to which is connected a driving shaft 2 for transmitting an output from the engine to the CVT. The CVT is comprised of a forward/reverse-changeover mechanism 3, a forwarding clutch 4, an input shaft 5, a hydraulic cylinder 6, a transmission belt 7, a movable driving pulley 8 (hereinafter referred to as "the driving pulley") 8, a driven shaft 9, a hydraulic cylinder 10, and a movable driven pulley (hereinafter referred to as "the driven pulley") 11. The driving shaft 2 is coupled to the input shaft 5 through the forward/reverse-changeover mechanism 3 and the forwarding clutch 4. The input shaft 5 carries thereon the driving pulley 8 which has a V-shaped groove width thereof varied as a moving driven pulley element 8a thereof axially slidably fitted on the input shaft 5 is axially moved by the hydraulic cylinder 6. The driven shaft 9 carries thereon the driven pulley 11, and the transmission belt 7 is trained between the pulleys 8 and 11. The driven pulley 11 has a V-shaped groove width thereof varied as a moving driven pulley element 11a thereof axially slidably fitted on the driven shaft 9 is axially moved by the hydraulic cylinder 10. The rotational speed ratio between the pulleys 8 and 11 (hereinafter referred to as "the speed ratio") is infinitely variable by controlling hydraulic pressure supplied to the hydraulic cylinders 6 and 10. The driven shaft 9 is coupled through a starting clutch 12 to an output shaft 14 provided with an output gear 13 which is coupled to a differential gear 17 through intermediate gears 15 and 16. The starting clutch 12 is comprised of two sets of friction plates 12a and 12b alternately juxtaposed such that the friction plates of one set can be brought into frictional engagement with associated ones of the other set, and a clutch piston, not shown, which is displaceable by hydraulic pressure supplied thereto to selectively cause engagement and disengagement between the friction plates of the two sets.

When the starting switch 12 is engaged with the CVT in a traveling range for example, a rotative driving force transmitted from the engine 1 to the driving shaft 2 is transmitted through the forwarding clutch 4 to the driving pulley 8, and then transmitted through the transmission belt 7 to the driven pulley 11. Further, a rotative driving force of the driven pulley 11 is transmitted to the starting clutch 12, wherein the rotative driving force is controlled according to a stepping-on amount of an accelerator pedal of the vehicle, not shown, etc., and then transmitted to the output shaft 14. A rotative driving force of the output shaft 14 is transmitted to the output gear 13, the intermediate gears 15 and 16, and the differential gear 17 to right and left driving wheels of the vehicle, not shown.

An electronic control unit (hereinafter referred to as "the ECU") 20 is electrically connected to fuel injection valves, various engine operating parameter sensors, etc. of the engine 1, for controlling the operation of the engine. Electrically connected to the ECU 20 is a transmission controller 31 for controlling oil pressure supplied to the hydraulic cylinders 6 and 10, etc. The transmission controller 31 is comprised of a CPU $31_1$ for executing various operational programs, a memory device $31_2$ including a ROM storing the operational programs executed by the CPU $31_1$ and various kinds of maps, referred to hereinafter, etc., and a RAM for storing results of calculations executed by the CPU 31, and an input/output interface $31_3$ for inputting output signals from various engine operating parameter sensors and starting clutch control parameter sensors, referred to hereinbelow, and outputting driving signals based on the results of calculations.

The transmission controller 31 is supplied with signals indicative of the engine rotational speed Ne, the throttle valve opening $\theta TH$, and the intake pipe absolute pressure PBA which are delivered from the ECU 20. The transmission controller 31 is also supplied with an output signal from an input shaft rotational speed sensor 21 arranged in the vicinity of the driving pulley 8, for detecting the rotational speed Ndr of the input shaft 5, an output signal from a driven shaft rotational speed sensor 22 arranged in the vicinity of the driven pulley 11, for detecting the rotational sped Ndn of the driven shaft 9, and an output signal from an output shaft rotational speed sensor 23 arranged in the vicinity of the output shaft 14, for detecting the vehicle speed VEL. Further electrically connected to the transmission controller 31 is a selector 40 of the automatic transmission for delivering a signal indicative of the position of a select lever, not shown, of the selector 40 to the transmission controller 31. In the present embodiment, the select lever can be selectively set to six positions, i.e. neutral (N), parking (P), driving (D), reverse (R), sports mode (S) and low (L).

The transmission controller 31 has an output side thereof connected to a PH/PL generator 32 for selectively generating high oil pressure (PH) and low oil pressure (PL), a four-way valve 33 for regulating the two levels of oil pressure from the PH/PL generator 32 and selectively distributing the regulated oil pressure to the hydraulic cylinder 6 of the driving pulley 8 and the hydraulic cylinder 9 of the driven pulley 11, and a starting clutch hydraulic controller 34 for controlling oil pressure supplied to the clutch piston of the starting clutch 12.

The PH/PL generator 32 and the starting clutch hydraulic controller 34 have oil intake sides thereof connected to an oil supply side of a hydraulic pump 35 which has its oil intake side connected to an oil tank 36. The PH/PL generator 32 has two oil supply ports connected, respectively, to two oil intake ports of the four-way valve 33 to supply the high oil pressure and the low oil pressure generated thereby to the four-way valve 33. The starting clutch hydraulic controller 34 has a linear solenoid valve, not shown, for controlling oil pressure supplied from the hydraulic pump 35 to a valve corresponding to a clutch transmission torque T2, hereinafter referred to.

The four-way valve 33 has two oil supply ports connected, respectively, to oil intake sides of the hydraulic cylinders 6 and 10, whereby oil pressure controlled by a control signal from the transmission controller 31 is supplied to the hydraulic cylinders 6 and 10.

Thus, according to the values of oil pressure supplied from the four-way valve 33 to the hydraulic cylinders 6 and 10, the V-shaped groove widths of the driving pulley 8 and the driven pulley 11 are determined to thereby control the speed reduction ratio of the CVT, i.e. the ratio NDR/NDN between the rotational speed NDR of the input shaft 5 and the rotational speed NDN of the drawn shaft 9. Further, torque generated by the driven shaft 9 is transmitted to the output shaft 14 through the starting clutch 12 at a ratio corresponding to the engaging state of the starting clutch 12, which is controlled by the transmission controller 31 and the starting clutch hydraulic controller 34, to thereby control the torque transmitted through the starting clutch.

Next, description will be made of control processing performed by the starting clutch control system constructed as above, particularly by the transmission controller 31, with reference to FIGS. 2 and 6.

Figure 2:
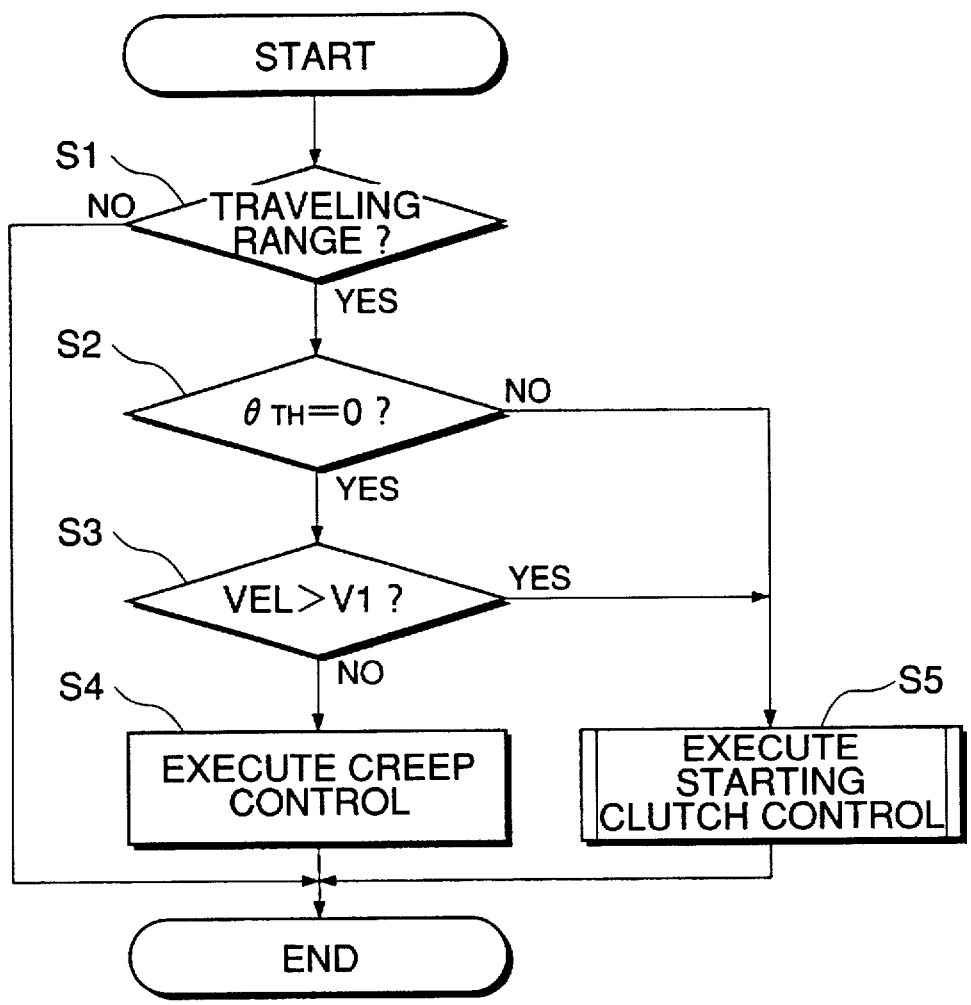
FIG. 2 is a flowchart showing a main routine for carrying out control processing executed by a CPU of a transmission control system appearing in FIG. 1.

FIG. 2 shows a program for carrying out the control processing executed by the CPU $31_1$ of the transmission controller 31.

First, at a step S1, it is determined whether or not the select lever of the selector 40 is set to a traveling range, i.e. whether or not it is set to any range other than the neutral (N) and parking (P) ranges. If the select lever is not set to a travelling range, the program is immediately terminated. On the other hand, if the select lever is set to a traveling range, the program proceeds to a step S2.

At the step S2, it is determined whether or not the throttle valve opening θTH is equal to "0", i.e. whether or not the throttle valve is almost fully closed. If θTH=0 holds, the program proceeds to a step S3, whereas if θTH≠0 holds, the program proceeds to a step S5.

At the step S3, it is determined whether or not the vehicle speed VEL is higher than a predetermined value V1 (e.g. approx. 5 km/h). If the answer is negative (NO), i.e. if VEL ≦ V1 holds, the program proceeds to a step S4, wherein the starting clutch 12 is caused to become engaged to a small degree to thereby carry out creep control, followed by terminating the present routine.

On the other hand, if VEL > V1 holds, the program proceeds to the step S5, wherein starting clutch control processing is executed, followed by terminating the program.

Figure 3:
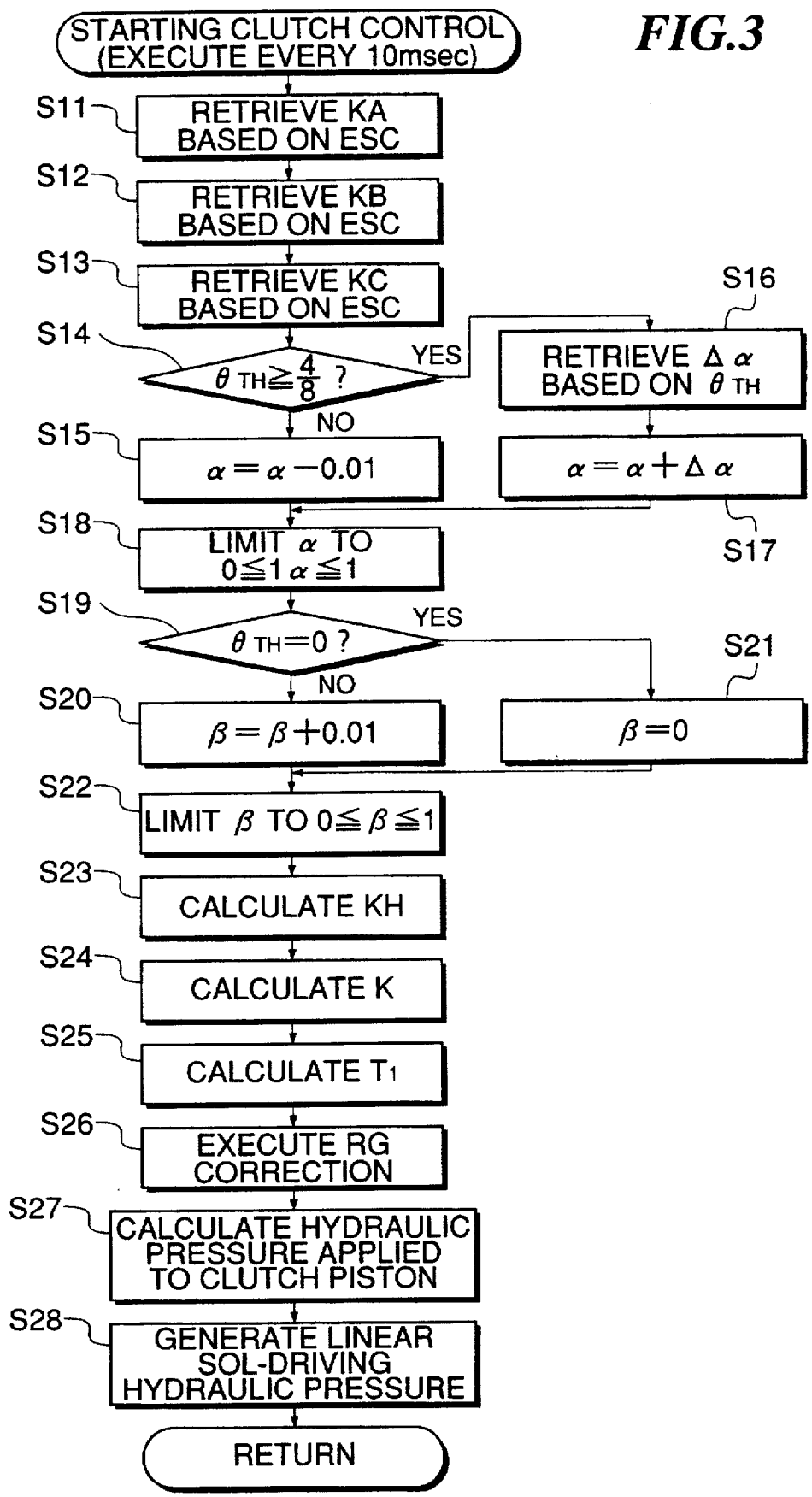
FIG. 3 is a flowchart showing a subroutine for carrying out starting clutch control processing executed at a step S5 in FIG. 2.

FIG. 3 shows a subroutine for carrying out the starting clutch control processing executed at the step S5 in FIG. 2. This subroutine is executed at predetermined time intervals (e.g. 10 msec).

First, at steps S11 to S13, three torque capacity coefficient maps stored in the memory device $31_2$ are retrieved to read out values of a torque capacity coefficient corresponding to a clutch speed ratio (ESC). The clutch speed ratio is a ratio VEL/Ndn, where VEL represents the rotational speed of the output shaft 14 detected by the output shaft rotational speed sensor 23, and Ndn the rotational speed of the driven shaft 9 detected by the driven shaft rotational speed sensor 22.

Figure 4:
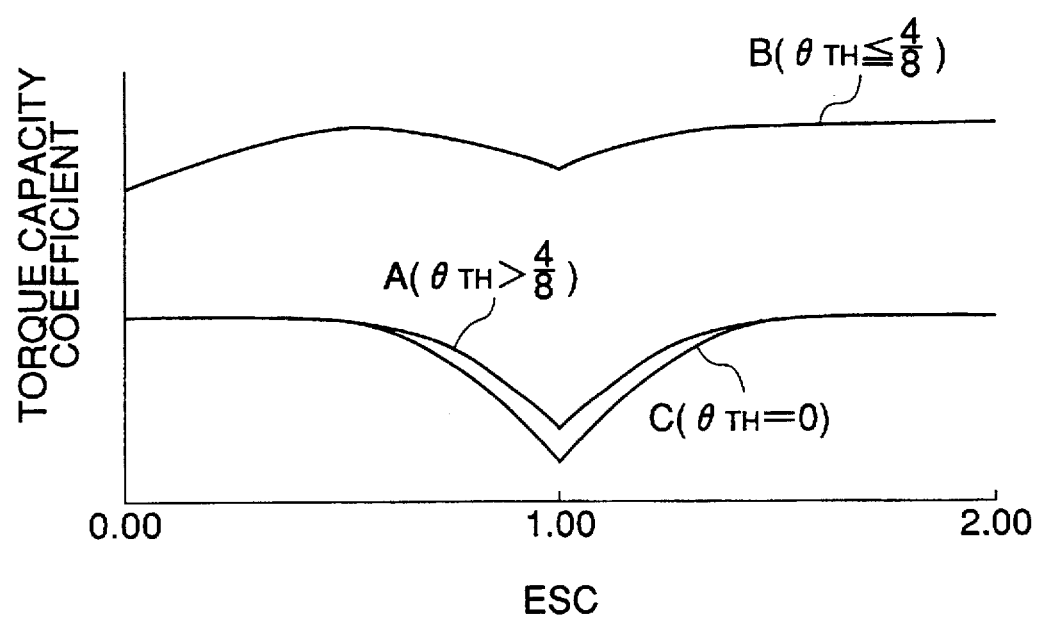
FIG. 4 is a graphical representation of torque capacity maps stored in a memory device in the transmission control system in FIG. 1.

FIG. 4 graphically represents the torque capacity coefficient maps stored in the memory device $31_2$. In the figure, the abscissa represents the clutch speed ratio ESC, and the ordinate the torque capacity coefficient. The value of the torque capacity coefficient according to the embodiment is determined based on the throttle valve opening θTH as an additional parameter. In FIG. 4, a curve A indicates a torque capacity coefficient curve to be assumed when the throttle valve opening θTH is in a range of 4/8<θTH≦8/8, a curve B when the throttle valve opening θTH is in a range of 0<θTH≦4/8, and a curve C when the throttle valve opening θTH is equal to 0.

As is clear from FIG. 4, the three torque capacity coefficient curves are all set such that the torque capacity coefficient value assumes a minimal value when the clutch speed ratio ESC is equal to "1.0". For example, the torque capacity coefficient values indicated by the curves A and C each progressively decrease as the clutch speed ratio ESC increases from a predetermined value smaller than "1.0" to "1.0", at which they each assume a minimal value. The torque capacity coefficient values each progressively increase to a predetermined value as the clutch speed ratio ESC increases from "1.0" to a predetermine value, and thereafter they are each held at the predetermined value irrespective of the clutch speed ratio ESC. According to the curve B, the torque capacity coefficient value assumes the minimum value when the clutch speed ratio ESC is equal to "0", and it linearly increase as the clutch speed ratio increases from "0". The torque capacity coefficient value assumes a maximal value when the clutch speed ratio ESC is equal to a predetermined value smaller than "1.0", and thereafter the curve B changes similarly to the curves A and C with a further increase in the ESC value.

By thus setting the torque capacity coefficient to the minimal value when the clutch speed ratio is equal to "1.0", when the starting clutch is brought into complete engagement, a shock caused by transmission torque fluctuations can be reduced due to lowering of the clutch torque. Further, large clutch torque is not required when the clutch speed ratio is equal to "1.0", and therefore the above setting of the torque capacity coefficient eliminates wasteful application of high oil pressure to the clutch.

By virtue of the above setting of the torque capacity coefficient, when the accelerator pedal is stepped on with the clutch speed ratio ESC set to "1.0" during steady running of the vehicle, the clutch torque is so low that the clutch slips, enabling a smooth increase in the engine rotational speed Ne and hence improving the accelerability. Conversely, when the accelerator pedal is suddenly released during traveling of the vehicle, the clutch slips (the clutch speed ratio decreases below "1.0"), eliminating a shock upon sudden release of the accelerator pedal.

Further, the reason why the torque capacity coefficient curve A is set to a relatively smaller level and the curve B is set to a relatively larger level is as follows: That is, when the throttle valve opening θTH is large (curve A), it usually means that the engine is being accelerated, or the vehicle is being started to run, and therefore the clutch torque should be prevented from becoming excessive to improve the driveability. On the other hand, when the throttle valve opening θTH is small (curve B), the slip of the starting clutch during cruising of the vehicle or the like should be reduced to thereby curtail fuel consumption. Moreover, by setting the torque capacity coefficient curve C to the smallest level a large shock upon closing of the throttle valve by engine braking can be sufficiently absorbed.

Further, the reason why the torque capacity coefficient curve B is set to the minimum value when the clutch speed ratio ESC is "0" and the coefficient value linearly increases with an increase in the ESC value from "0" is as follows:

As described hereinafter, according to the starting clutch control processing of this embodiment, the three torque capacity coefficient maps are retrieved, and when two of the three torque capacity coefficient values read out therefrom have a level difference, one of the two torque capacity coefficient values is controlled so as to progressively approach to the other torque capacity coefficient value. For example, when the throttle valve opening θTH is "0", e.g. when the vehicle is in stopping and the clutch speed ratio is small, if the accelerator pedal is slightly stepped on, the torque capacity coefficient value shifts from the curve C (θTH=0) to the curve B (θTH≦4/8). If the level difference is large, large torque fluctuations are generated, whereby a passenger or passengers of the vehicle receive a large shock.

Referring again to FIG. 3, at the step S11, out of the three torque capacity coefficient maps, a map indicated by the curve A is retrieved to read out a torque capacity coefficient value corresponding to the clutch speed ratio ESC, and the thus read out value is stored in an area KA (hereinafter referred to as the "torque capacity coefficient KA") preset in the memory device $31_2$. Then, at the step S12, a map indicated by the curve B is retrieved to read out a torque capacity coefficient value corresponding to the clutch speed ratio ESC, and the read out value is stored in an area KB (hereinafter referred to as the "torque capacity coefficient KB") preset in the memory device $31_2$. Further, at the step S13, a map indicated by the curve C is retrieved to read out a torque capacity coefficient value corresponding to the clutch speed ratio, and the read out value is stored in an area KC (hereinafter referred to as the "torque capacity coefficient KC") preset in the memory device $31_2$.

Next, it is determined at a step S14 whether or not the throttle valve opening θTH is larger than 4/8. If θTH<4/8 holds, a value of 0.01 is subtracted from a value in an area α (hereinafter referred to as "the weight coefficient α") preset in the memory device $31_2$, whereby the weight coefficient α is updated by the result of the subtraction at a step S15. The weighting coefficient α will be explained in detail hereinafter. On the other hand, if θTH≧4/8 holds at the step S14, a table shown in FIG. 5 is retrieved to read out a rate of variation Δα in the weighting coefficient α according to the throttle valve opening θTH, at a step S16, and then the rate of variation Δα is added to the weighting coefficient α, whereby the weighting coefficient α is updated by the result of the addition, at a step S17. Then, the weighting coefficient α updated at the step S15 or S17 is limit-checked such that it is limited within a range of 0≦α≦1 at a step S18.

At the following step S19, it is determined whether or not the throttle valve opening θTH is equal to "0". If θTH≠0 holds, a value of 0.01 is added to a value in an area β (hereinafter referred to as "the weighting coefficient β") preset in the memory device $31_2$, whereby the weighting coefficient β is updated by the result of the addition at a step S20. The weighting coefficient β will also be explained in detail hereinafter. On the other hand, if θTH=0 holds at the step S19, the weighting coefficient β is set to "0" at a step S21. Further, similarly to the step S18, the weighting coefficient β updated at the step S20 is limit-checked at a step S22.

Next, by using the torque capacity coefficient value KB indicated by the curve B, a high-side torque capacity coefficient KH for calculating a final torque capacity coefficient K is calculated by the use of the following equation (1):

$$KH = \alpha \times KA + (1-\alpha) \times KB \quad (1)$$

As is clear from the equation (1), the weighting coefficient α controls a shifting time period over which the torque capacity coefficient KA or KB is progressively shifted from the torque capacity coefficient KA or KB to the other one. For example, if the rate of variation Δα in the weighting coefficient α is positive, the weighting coefficient α increasingly approaches to 1, and accordingly the torque capacity coefficient is progressively shifted from the KB value to the KA value. On this occasion, as explained at the step S16, the rate of variation Δα is changed according to the throttle valve opening θTH, and accordingly the shifting time period is changed according to the throttle valve opening θTH. On the other hand, if the rate of variation Δα in the weighting coefficient α is negative (−0.01 in the present embodiment), the weighting coefficient a decreasingly approaches to 0, and accordingly the torque capacity coefficient value is progressively shifted from the KA value to the KB value. In this example, a time period required for the weighting coefficient a to change from "1" to "0" is 1 sec. This is because the starting clutch control processing according to the present embodiment is executed every 10 msec and the weighting coefficient α decreases by 0.01 every execution of the control processing.

Next, by using the high-side torque capacity coefficient KH thus calculated, the final torque capacity coefficient K is calculated by the use of the following equation (2):

$$K = \beta \times KH + (1-\beta) \times KC \quad (2)$$

The equation (2) has a construction similar to that of the equation (1), and accordingly the weighting coefficient β shows a change similar to the change of the weighting coefficient α described above. Therefore, description of the change of the weighting coefficient β is omitted.

The weighting coefficients α and β are set such that the torque capacity set based on the torque capacity coefficient map and the throttle valve opening θTH rapidly changes in the decreasing direction, and slowly changes in the increasing direction. In the present embodiment, when the torque capacity coefficient value is shifted from the capacity coefficient map indicated by the curve A or B to the torque capacity coefficient map indicated by the curve C, β is set to "0", so that the torque capacity coefficient is rapidly shifted to the curve C. On the other hand, when the torque capacity coefficient value is shifted from the torque capacity coefficient map indicated by the curve C to the torque capacity coefficient map indicated by the curve A or B, Δβ is set to 0.01 so that the torque capacity coefficient is slowly or progressively shifted to the curve A or B. Similarly, α is set such that when the torque capacity coefficient value is shifted from the torque capacity coefficient map indicated by the curve B to the torque capacity coefficient map indicated by the curve A, the torque capacity coefficient is rapidly shifted to the curve A, whereas when the torque capacity coefficient value is shifted from the torque capacity coefficient map indicated by the curve A to the torque capacity coefficient map indicated by the curve B, the torque capacity coefficient is rapidly shifted to the curve B. However, when the throttle valve is almost fully open, α is set such that the torque capacity rapidly increases.

By thus setting the weighting coefficients α and β, the clutch is slowly engaged to prevent a shock upon sudden engagement of the clutch when the engine torque is increasing. On the other hand, the clutch is allowed to be rapidly engaged when the engine torque is at a low level, because sudden engagement of the clutch at that time does not cause a shock.

Next, the thus calculated final torque capacity coefficient K is multiplied by a basic torque PSTBM determined based on the range selected by the selector 40 and the engine rotational speed Ne, to calculate a torque T1 by the use of the following equation (3), at a step S25:

$$T1 = K \times PSTBM \quad (3)$$

Figures 5, 6:
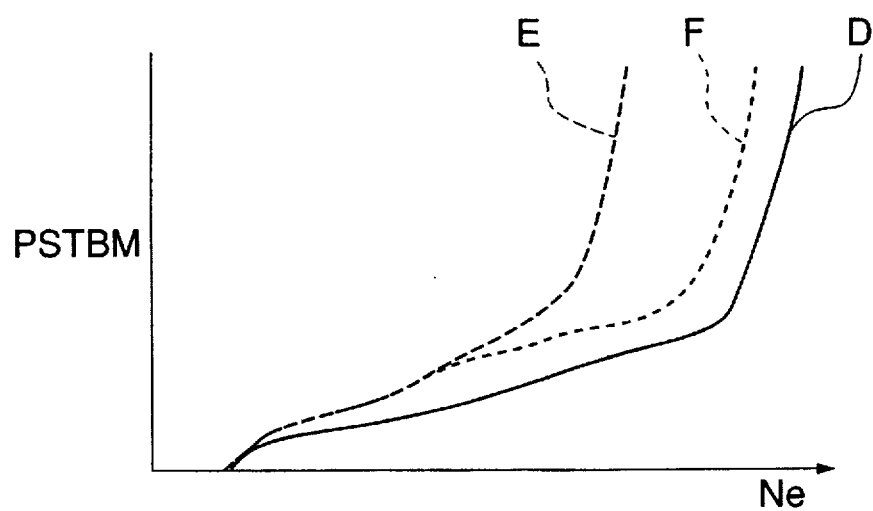
FIG. 5 shows an example of a table for determining a rate of variation $\Delta \alpha$ in a weighting coefficient a according to the throttle valve opening $\theta TH$.
FIG. 6 is a graphical representation of maps for determining a correction coefficient PSTBM for correcting a final torque capacity coefficient K calculated at a step S24 in FIG. 3.

FIG. 6 graphically represents PSTBM maps which are used for determining the basic torque PSTBM stored in the memory device $31_2$. In FIG. 6, the abscissa represents the engine rotational speed Ne, and the ordinate the basic torque PSTBM. As is clear from FIG. 6, three maps are stored in the memory device $31_2$ corresponding to respective ranges selected by the selector 40. More specifically, a curve D indicates a basic torque PSTBM curve corresponding to the ranges N, P and R, a curve E the range D, and the curve F the ranges S and L. At the step S25, one of the PSTBM maps which corresponds to the selected range is retrieved to read out a value of the basic torque PSTBM according to the engine rotational speed Ne. The torque value T1 is calculated based on the read-out basic torque PSTBM and the final torque capacity coefficient K.

The thus calculated torque T1 is corrected by a ratio RG which is the current rotational speed ratio NDR/NDN between the rotational speed NDR of the input shaft 5 and the rotational speed NDN driven shaft 9, to thereby calculate the clutch transmission torque T2 by the use of the following equation (4), at a step S26:

$$T2 = T1 \times RG \quad (4)$$

Figure 7:
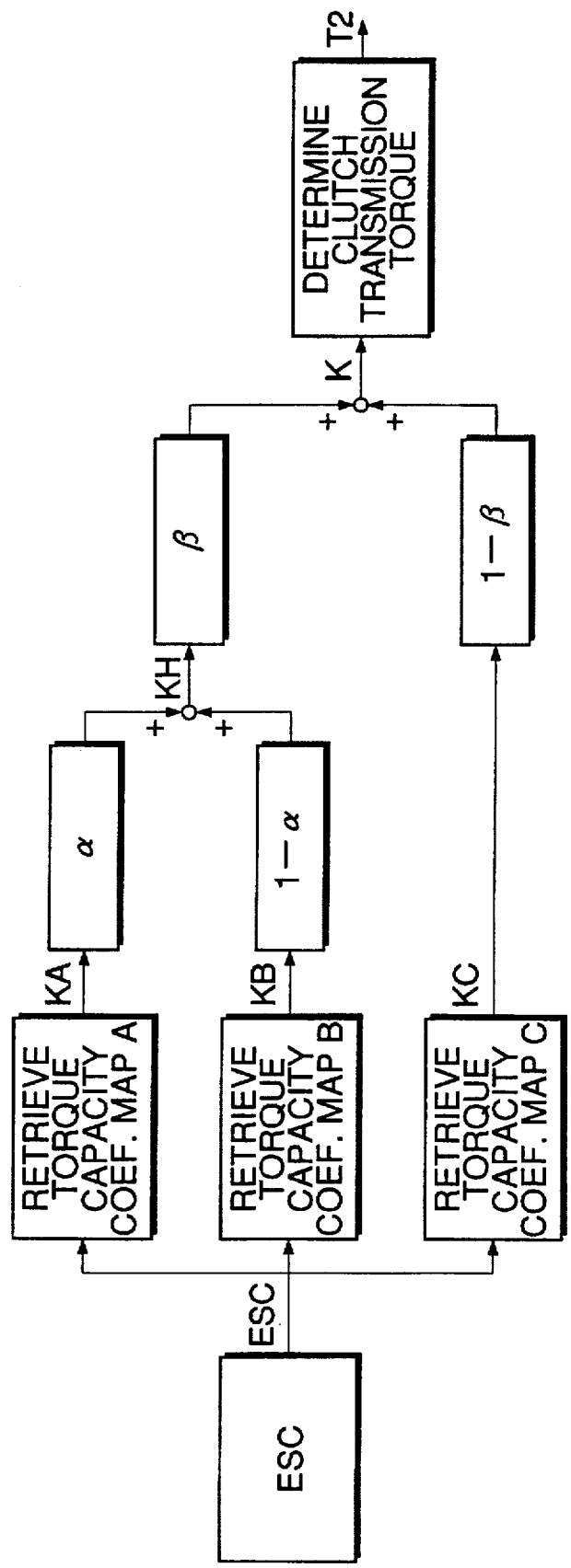
FIG. 7 is a block diagram showing an outline of the starting clutch control processing carried out at steps S11 to S26 in FIG. 3.

FIG. 7 shows an outline of the starting clutch control processing executed at the steps S11 in FIG. 3 described above.

Referring again to FIG. 3, at a step S27, a value of oil pressure applied to the clutch piston is calculated according to the clutch transmission torque T2 calculated at the step S26. Then, at a step S28, a driving signal is supplied to the linear solenoid valve of the starting clutch hydraulic controller 34 to control the oil pressure from the hydraulic pump 35 to the value calculated at the step S27, followed by terminating the present routine.

As described above, according to the present embodiment, three torque capacity coefficient maps are provided beforehand, and two torque capacity maps are selected out of the three maps according to the throttle valve opening θTH. The torque capacity coefficient is controlled so as to be progressively shifted from a value retrieved from one of the two selected torque coefficient maps according to the clutch speed ratio to a value retrieved from the other torque capacity coefficient map according to the clutch speed ratio. As a result, even when the throttle valve opening θTH is suddenly changes, a shock on the passengers can be significantly reduced. Further, when the throttle valve opening θTH is larger than a predetermined value (4/8), the torque capacity coefficient curve is set to a higher level to thereby curtail fuel consumption during cruising of the vehicle or a like traveling condition, while when the throttle valve opening θTH is smaller than the predetermined value, the torque capacity curve is set to a lower level to thereby allow a suitable slip of the clutch and hence improve driveability.

Furthermore, the three torque capacity maps are all set such that the torque capacity coefficient assumes a minimal value when the clutch speed ratio is "1.0" and progressively increases as the clutch speed ratio decreases or increases from "1.0". As a result, shocks upon engine torque fluctuations due to sudden operation of the throttle valve can be sufficiently absorbed over a wide range of clutch speed ratio, to thereby further improve drivability.

Although in the present embodiment, the torque T1 is determined based on the torque capacity coefficient and the basic torque PSTBM determined according to the selected range, this is not limitative. In addition to the basic torque PSTBM, another basic torque or coefficients dependent upon another parameter or parameters may be further employed.

What is claimed is:

1. A control system for a starting clutch installed in an automotive vehicle having an internal combustion engine and at least one wheel, said engine having a throttle valve and said starting clutch being arranged between said engine and said at least one wheel, wherein said control system comprises:

engine rotational speed-detecting means for detecting a rotational speed of said engine;

clutch speed ratio-detecting means for detecting a speed ratio of said starting clutch;

throttle valve opening-detecting means for detecting opening of said throttle valve;

basic torque capacity-calculating means for calculating a basic torque capacity of said starting clutch, based on said rotational speed of said engine detected by said engine rotational speed-detecting means;

torque capacity correction value-determining means for determining, based on said throttle valve opening detected by said throttle valve opening-detecting means, a torque capacity correction value having a minimal value when said clutch speed ratio detected by said clutch speed ratio-detecting means is equal to 1.0, said torque capacity correction valve progressively increasing as said clutch speed ratio increases and decreases from 1.0;

torque capacity-determining means for determining a torque capacity of said starting clutch, based on said torque capacity correction value determined by said torque capacity correction value-determining means and said basic torque capacity calculated by said basic torque capacity-calculating means; and control means for controlling engagement between said engine and said at least one wheel based on said torque capacity determined by said torque-capacity determining means.

2. A control system as claimed in claim 1, wherein, when said detected throttle valve opening is larger than a predetermined value, said torque capacity correction value-determining means sets said torque capacity correction value to such a value that said torque capacity of said starting clutch has a smaller value than a value assumed when said throttle valve opening is smaller than said predetermined value.

3. A control system as claimed in claim 2, wherein, when said detected throttle valve opening is almost zero, said torque capacity correction value-determining means sets said torque capacity correction value to such a value that said torque capacity of said starting clutch has a further smaller value than said value assumed when said throttle valve opening is larger than said predetermined value.

4. A control system as claimed in claim 2, wherein said torque capacity correction value-determining means sets said torque capacity correction value such that said torque capacity of said starting clutch is increased as said clutch speed ratio increases, when said detected throttle valve opening is smaller than said predetermined value and at a same time said detected clutch speed ratio is smaller than a preset value which is smaller than 1.0.

5. A control system as claimed in claim 2, wherein said torque capacity correction value-determining means sets said torque capacity correction value to a minimum value when said detected throttle valve opening is smaller than said predetermined value but not equal to zero and at a same time said detected clutch speed ratio is equal to zero.

6. A control system as claimed in claim 1, further comprising torque capacity correction value-changing means for changing said torque capacity correction value determined by said torque capacity correction value-determining means, based on said throttle valve opening detected by said throttle valve opening-detecting means, and wherein said torque capacity correction value-determining means determines a plurality of torque capacity correction value characteristics corresponding respectively to a plurality of different throttle valve opening ranges, said torque capacity correction value-changing means changing said torque capacity correction value so as to be progressively shifted from a first value determined according to a first one of two torque capacity correction value characteristics out of said plurality of said torque capacity correction value characteristics to a second value determined according to a second one of said two torque capacity correction value characteristics.

7. A control system as claimed in claim 6, wherein said torque capacity correction value-changing means carries out said progressive shifting of said torque capacity correction value at a higher rate when said first one of said two torque capacity correction value characteristics has a higher level than said second one of said two torque capacity correction value characteristics, said torque capacity correction value-changing means carrying out said progressive shifting at a lower rate when said first one of said two torque capacity correction characteristics has a lower level than said second one of said two torque capacity correction value characteristics.

8. A control system as claimed in claim 3, wherein said torque capacity correction value-determining means sets said torque capacity correction value such that said torque capacity of said starting clutch is increased as said clutch speed ratio increases, when said detected throttle valve opening is smaller than said predetermined value and at a same time said detected clutch speed ratio is smaller than a preset value which is smaller than 1.0.

9. A control system as claimed in claim 3, wherein said torque capacity correction value-determining means sets said torque capacity correction value to a minimum value when said detected throttle valve opening is smaller than said predetermined value but not equal to zero and at a same time said detected clutch speed ratio is equal to zero.

* * * * *